Sept. 16, 1930.                G. SPATTA                1,775,659
                              CLAMPING RING
                         Original Filed May 28, 1928
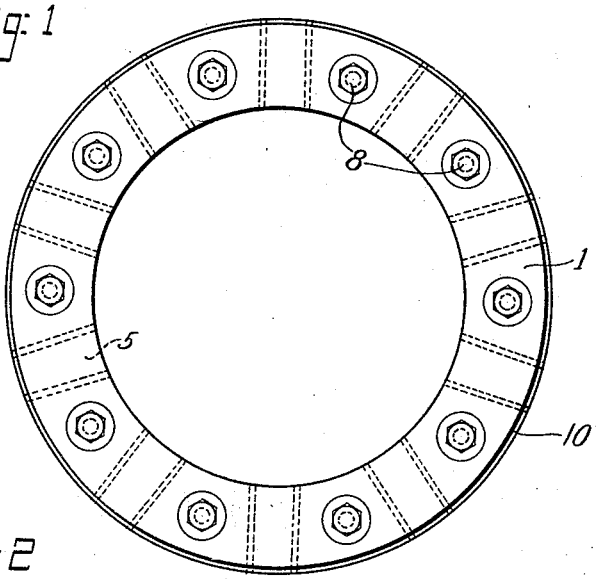
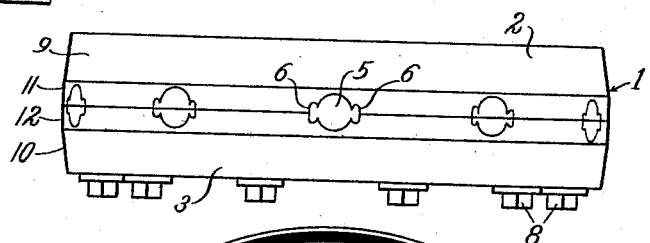
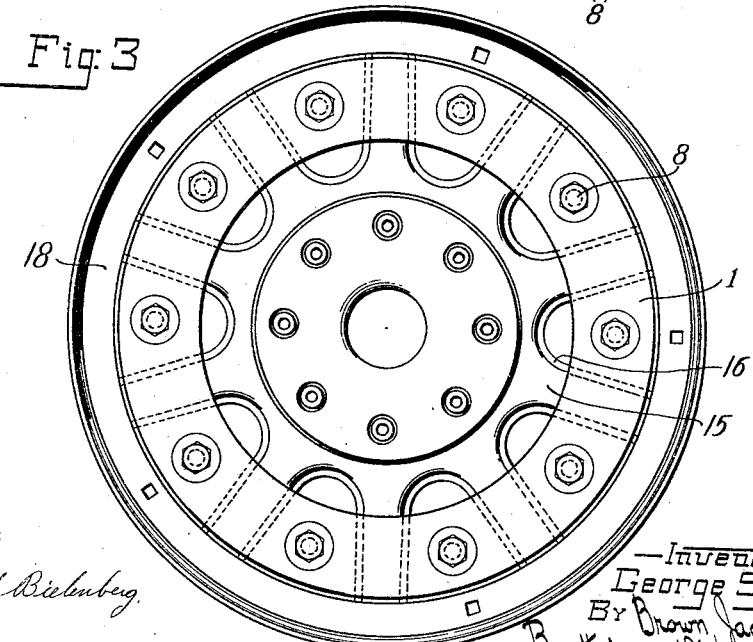

Patented Sept. 16, 1930

1,775,659

UNITED STATES PATENT OFFICE

GEORGE SPATTA, OF BUCHANAN, MICHIGAN, ASSIGNOR TO CLARK EQUIPMENT COMPANY, OF BUCHANAN, MICHIGAN, A CORPORATION OF MICHIGAN

CLAMPING RING

Original application filed May 28, 1928, Serial No. 280,981. Divided and this application filed April 15, 1929. Serial No. 355,072.

This application is a division of my copending application, Serial No. 280,981, filed May 28, 1928, and relates to tools for the manufacture of sheet metal wheels.

The wheel, in the manufacture of which the present tool is used, comprises a spider formed in two halves of sheet metal, joined together into an integral mechanical structure, the spider being then forced under compression into a channel shaped rim or felloe and there locked or otherwise secured in place. The present tool comprises a clamping ring for supporting the spider as the same is forced into the rim or felloe. In the present form of wheel the spider is made of sheet metal of the order of fifty-thousandths of an inch in thickness and when forced into the rim or felloe the spider is under compression and the felloe under tension. Under these conditions, it is essential that the spider be suitably supported as it is forced into the felloe, for if it is not suitably supported it is likely to be crushed or otherwise distorted during the course of action.

The clamping ring of the present invention comprises a split ring adapted to clamp the spider adjacent the ends of the spokes and to support the ends of the spokes while the spider is being forced into the rim or the felloe.

Reference may now be had to the accompanying drawings showing a preferred embodiment of the present device.

In the drawings:

Fig. 1 is a plan view of the clamping rings;

Fig. 2 is an edge view of the same; and

Fig. 3 is a plan view of the spider forced into the rim or felloe with the clamping device in place.

The clamping ring 1 is a split clamp made up of two similar halves, 2 and 3, both halves having radial holes or slots adapted to fit the ends of the spokes. The spider with which the present clamp is to be used comprises two complementary members having tubular spokes united along their meeting edges by lock seams formed by pressing a channel or U-shaped clip into tight engagement with cooperating flanges formed on the margins of the spokes. The clamping rings are provided with seats for the ends of the bolts, said seats comprising radial holes 5 in each of the clamping rings, which holes are shaped to fit closely the ends of the spokes and are provided with extensions or radial slots 6 into which the seams along the spokes fit. The two halves of the clamping ring are adapted to clamp upon the spokes of the spider and are secured together by clamping screws 8 so as to hold the spider securely. The clamping members 2 and 3 are provided with conical shoulders as indicated at 9 and 10, and have cylindrical parts 11 and 12 of a width slightly greater than the diameter of the individual spokes. As a result, the outer edges at each of the spokes are firmly supported when the clamp is closed.

In using the clamping tool the clamping screws 8 are loosened and the halves 2 and 3 of the clamping ring are separated so as to permit the insertion of a spider such as indicated at 15 between the rings, the spokes of the spider lying in the radial slots 5 in the clamping ring. The seams 16 connecting the complementary halves of the spider lie within the slots along the radial holes 5. The two halves of the clamping ring are then firmly clamped together by means of the clamping screws 8 so as to hold the spider securely. The ends of the spokes lie substantially flush with the cylindrical surface 11, or may project outwardly therefrom a few thousandths of an inch. The clamping ring 1 with the spider 15 securely clamped in place is then pressed into the rim or felloe 18. This felloe may consist of a rolled metal ring of outwardly formed channel section.

Obviously, in so far as the present clamping ring is concerned, the felloe 18 may be of any desired construction. The spider with the clamping ring supporting the ends thereof is forced into the felloe by hydraulic pressure or in any other suitable manner. The insertion of the spider into the felloe places the spider under compression and the felloe under tension, the clamping ring supporting the ends of the spokes of the spider against lateral crushing during the working operations. When the spider has been inserted into place, the clamping ring may be retained in position while subsequent working operations are performed upon the wheel, the clamping ring lending support to the spokes of the spider during such working operations. To remove the clamping ring, the clamping nuts 8 are loosened and the two halves of the clamping ring are forced out of the felloe.

In compliance with the requirements of the patent statutes, I have herein shown and described a preferred embodiment of my invention. The invention is, however, not limited to the precise embodiment herein shown, the same being merely illustrative of the invention. What I consider new and desire to secure by Letters Patent is:

1. A clamp for inserting a spider in a rim, comprising a pair of circular plates having radially extending seats adapted to receive the spokes of a spider, and means for clamping said plates together, said plates having shoulders for supporting the spider against radial thrust.

2. A clamping and holding device, comprising a pair of rings having radially extending seats facing each other for receiving the ends of spokes of a sheet metal spider, said rings having shoulders for supporting the rings and the clamped spider against radial pressure.

3. A clamping device comprising a pair of rings having radially extending openings facing each other for receiving the ends of spokes of a spider, the portion of the outer periphery of the rings that is adjacent the radial openings being a substantially cylindrical surface and the portion of the rings on the outer ends of the substantially cylindrical surface being slightly convergent to facilitate the insertion of the clamping rings into the rim of a wheel.

4. A clamping device comprising two similar ring members, clamping means for clamping the rings together, the two rings having uniformly spaced radially extending substantially semi-cylindrical openings along their meeting faces, the openings in the two ring members being opposite one another, whereby the ring members may be clamped about the end of tubular spokes of a wheel spider, the portion of the outer surface of the ring members remote from the meeting faces being tapered, and the portion of the outer surface of the ring members adjacent the meeting faces being substantially cylindrical.

In witness whereof, I hereunto subscribe my name this 9th day of April, 1929.

GEORGE SPATTA.